United States Patent
Haruyama

(10) Patent No.: US 6,993,261 B2
(45) Date of Patent: *Jan. 31, 2006

(54) RECEIVING APPARATUS, TRANSMITTING APPARATUS, AND COMMUNICATION SYSTEM

(75) Inventor: Shinichiro Haruyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/089,662

(22) Filed: Mar. 25, 2005

(65) Prior Publication Data

US 2005/0169647 A1  Aug. 4, 2005

Related U.S. Application Data

(62) Division of application No. 09/824,911, filed on Apr. 3, 2001, now Pat. No. 6,925,261.

(30) Foreign Application Priority Data

Apr. 6, 2000  (JP)  ............................ P2000-110557

(51) Int. Cl.
*H04J 14/02* (2006.01)

(52) U.S. Cl. ...................................... 398/129; 398/131
(58) Field of Classification Search ........ 398/128–131, 398/137, 50, 68, 75, 159, 59, 79
See application file for complete search history.

(56) References Cited

*Primary Examiner*—David C. Payne
(74) *Attorney, Agent, or Firm*—Jay H. Maioli

(57) ABSTRACT

A receiving apparatus and transmitting apparatus capable of transmitting and receiving a high speed optical signal and a communication system using the same, including a transmitting apparatus having a conversion circuit for converting serially input data to a plurality of bits of parallel data given predetermined information and an LED array having a number of LED units corresponding to the number of bits of the parallel data from the conversion circuit arranged in an array, wherein the LED units are controlled in light emission in parallel based on bit information of corresponding parallel data to emit optical information signals dispersed in a spatially predetermined range, and of a receiving apparatus having a plurality of photo-diodes arranged in an array for emitting electric signals of levels in accordance with amounts of light received, wherein the photo-diodes output electric signals in parallel.

4 Claims, 5 Drawing Sheets

RECEIVING APPARATUS, TRANSMITTING APPARATUS, AND COMMUNICATION SYSTEM

This is a division of prior application Ser. No. 09/824,911 filed Apr. 3, 2001, now U.S. Pat. No. 6,925,261.

BACKGROUND OF THE INVENTION

1. Field of the Invention

The present invention relates to a receiving apparatus and transmitting apparatus for receiving and transmitting data as information light and a communication system using the same.

2. Description of the Related Art

As a communication system for transmitting data converted to optical information, optical information transmission systems using optical fibers as a transmission medium are in practical use.

In recent years, there has been remarkably progress in optical communication technology. Transmission of various kinds of information including image information by optical fibers is being realized to not only trunk lines, but also the level of the general homes, by links to not only telephone systems, but also computer networks.

The transfer rate has been improved enabling even communication at 100 Mbps and further 200 Mbps or 400 Mbps (on the frequency level, a giga-(G) hertz order, for instance, 2.4 to 5 GHz).

Summarizing the problem to be solved by the invention, when transmitting various kinds of information including image information by optical fibers to for example the general homes as explained above, the transmitted information is delivered to a personal computer, television, telephone, etc. (hereinafter, referred to as data processing apparatuses).

In this case, when the information processing apparatus is installed in one place, it is possible to lay an optical fiber inside the home for transfer of the optical information as it is to the information processing apparatus for example via an optical repeater and convert the optical information to an electric signal at the information processing apparatus side.

It is also possible to move the information processing apparatus around instead of installing it in one place, however, this is not practical in that it is then necessary to re-lay the optical fiber.

Use of wireless communication using radio waves can therefore be considered. Wireless communication is however only possible using the tens of Mbps to 100 Mbps range due to legal restrictions.

Accordingly, wireless communication cannot be applied for recent high speed optical communication of 100 Mbps or more.

Therefore, it is considered practical to convert an optical signal transmitted from the outside over an optical fiber to an electric signal by an optical repeater, convert the electric signal back to an optical signal to generate optical information (hereinafter, information light), and convert it back from an optical signal to electric signal at the information processing apparatus side.

A semiconductor laser and a light-emitting diode can be used for emitting information light, but a semiconductor laser is not preferable due to problems of directivity etc.

Accordingly, it is preferable to use a light-emitting diode. There are however official restrictions on the strength, and therefore problems remains in the strength per predetermined area. Under the current circumstances, construction of a communication system capable of reliably transmitting and receiving a high speed optical signal is difficult.

SUMMARY OF THE INVENTION

The object of the present invention is to provide a receiving apparatus and a transmitting apparatus capable of reliably transmitting and receiving a high speed optical signal and a communication system using the same.

According to a first aspect of the present invention, there is provided a receiving apparatus for receiving information light, comprising a light receiving element array comprised of a plurality of light receiving elements for outputting electric signals at levels in accordance with amounts of light received arranged in an array, wherein the light receiving elements output the electric signals in parallel and an information extraction circuit for receiving the plurality of electric signals output in parallel from the light receiving element array and extracting information in accordance with the information light based on the plurality of electric signals.

According to a second aspect of the present invention, there is provided a transmitting apparatus comprising a conversion circuit for converting serially input data to a plurality of bits of parallel data respectively giving predetermined information and a light emitting diode array comprising light emitting diode units of at least a number corresponding to the number of bits of parallel data from the conversion circuit arranged in an array, wherein the respective light emitting diode units are controlled in light emission in parallel based on bit information of the corresponding parallel data to emit information light dispersed in a spatially predetermined range.

According to a third aspect of the present invention, there is provided a communication system comprising a transmitting apparatus for transmitting information light and a receiving apparatus including a light receiving element array comprising a plurality of light receiving elements for outputting electric signals at levels in accordance with amounts of light received arranged in an array, wherein the respective light receiving elements output electric signals in parallel, and an information extraction circuit for receiving a plurality of electric signals output in parallel from the light receiving element array and extracting information in accordance with the information light based on the plurality of electric signals.

Also, according to the present invention, the receiving apparatus is further comprising an optical system for condensing the information light to a predetermined region of a light receiving region of the light receiving element array.

Also, according to the present invention, the optical system is capable of adjusting a position of a light axis direction based on a control signal; and the information extraction circuit outputs the control signal for adjusting a position of the light axis direction to the optical system when information in accordance with the information light cannot be extracted based on the plurality of electric signals.

Also, according to the present invention, a wavelength of the information light is a wavelength included in a visible range.

Also, according to the present invention, the information light includes a plurality of information corresponding to bits of plurality of bits of parallel data and is dispersed in a spatially predetermined range.

Also, according to the present invention, an information extraction circuit of the receiving apparatus comprises a binarizing circuit for binarizing a plurality of electric signals by the light receiving element array; a data selection circuit for selecting data corresponding to the information light from the plurality of binarized data from the binarizing circuit; and a conversion circuit for decoding data corresponding to an information light selected by the data selection circuit and converting it from parallel data to serial data.

According to a fourth aspect of the present invention, there is provided a communication system comprising a transmitting apparatus comprising a conversion circuit for converting serially input data to a plurality of bits of parallel data respectively giving predetermined information and a light emitting diode array comprising light emitting diode units of at least a number corresponding to the bits of parallel data from the conversion circuit arranged in an array, wherein the respective light emitting diode units are controlled in light emission in parallel based on bit information of the corresponding parallel data to emit information light dispersed in a spatially predetermined range; and a receiving apparatus including a light receiving element array comprised of a plurality of light receiving elements for outputting electric signals at levels in accordance with amounts of light received arranged in an array, wherein the respective light receiving elements output electric signals in parallel, and an information extraction circuit for receiving a plurality of electric signals output in parallel from the light receiving element array and extracting information in accordance with the information light based on the plurality of electric signals.

According to the present invention, information light, for example, having a wavelength included in a visible range is transmitted, for example, from a transmitting apparatus.

The information light transmitted from the transmitting apparatus is irradiated on a predetermined region of a light receiving element array of a receiving apparatus via an optical system.

In the light receiving element array, a plurality of electric signals of levels in accordance with the amounts of light received are generated by all of the light receiving elements including those in the region where the information light was received and are supplied to an information extraction circuit.

In the information extraction circuit, information in accordance with the information light is extracted based on the plurality of electric signals output in parallel from the light receiving element array.

Also, according to the present invention, for example, serial data is supplied to a conversion circuit of the transmitting apparatus. The serial data is given predetermined information, and converted to a plurality of bits of parallel data, and supplied to a light-emitting diode array.

In the light-emitting diode array, the light-emitting diode units of the number corresponding to the number of bits of the parallel data from the conversion circuit are controlled in light emission in parallel based on bit information of the corresponding parallel data.

As a result, information light dispersed within a spatially predetermined range is emitted from the light-emitting diode array.

The information light dispersed within a spatially predetermined range transmitted from the transmitting apparatus is irradiated on a predetermined range of the light receiving element array of the receiving apparatus, for example, via an optical system.

In the light receiving element array, a plurality of electric signals of levels in accordance with the amounts of light received are generated by all of the light receiving elements including those in the region where the information light was received and are supplied to the information extraction circuit.

In the information extraction circuit, the plurality of electric signals from the light receiving element array are, for example, binarized in a binarizing circuit and supplied to a data selection circuit.

In the data selection circuit, data corresponding to the information light is selected from the plurality of binary data from the binarizing circuit and supplied to a conversion circuit.

Then, in the conversion circuit, data corresponding to the information light selected by the data selection circuit is decoded, converted from parallel data to serial data, and output.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Figure 1:
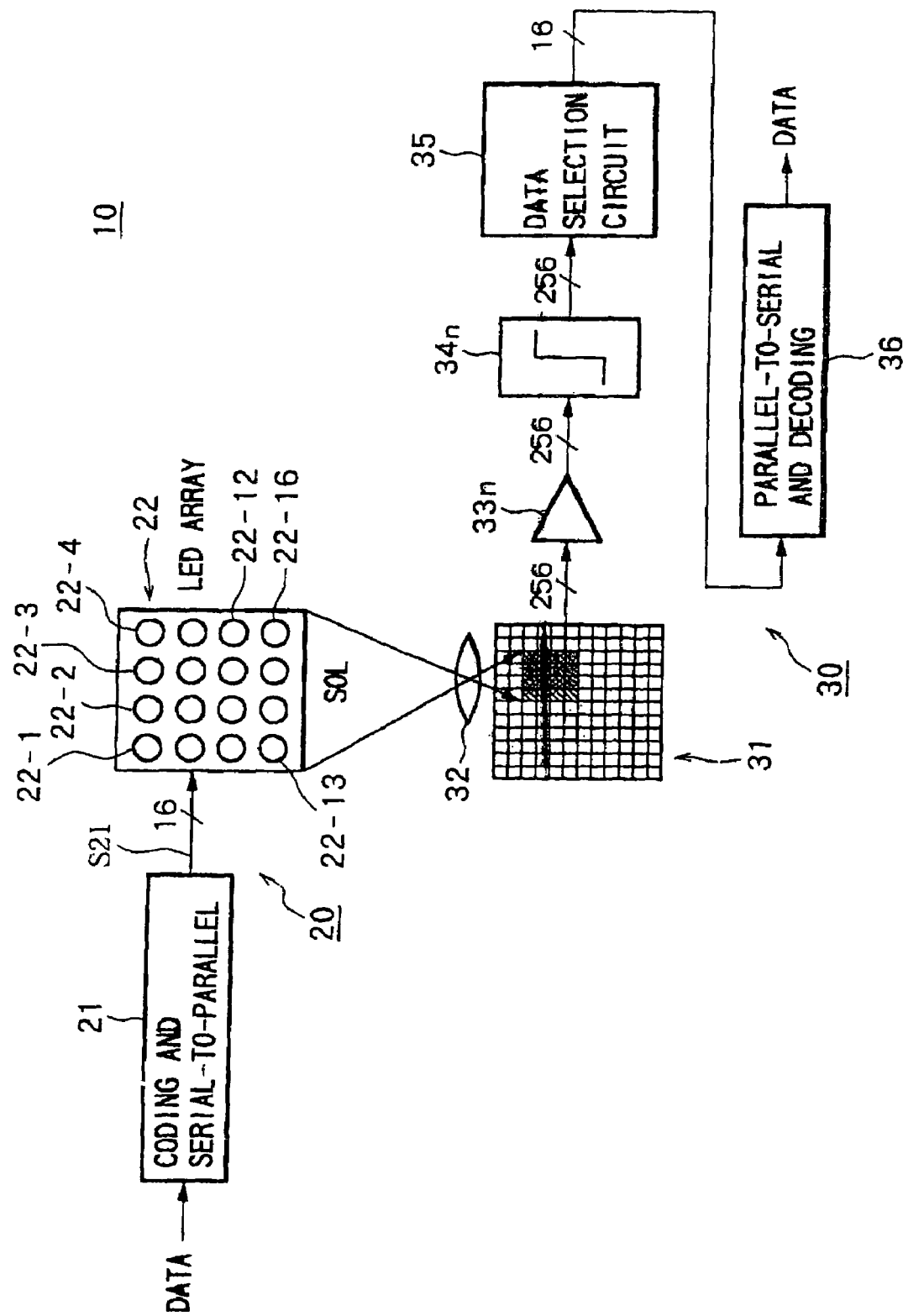
FIG. 1 is a view of the system configuration of a first embodiment of a communication system using a receiving apparatus and a transmitting apparatus according to the present invention.

Below, an explanation will be made of embodiments of the present invention by referring to the drawings.

First Embodiment

FIG. 1 is a view of the system configuration of a first embodiment of a communication system using a receiving apparatus and a transmitting apparatus according to the present invention.

A communication system 10 comprises a transmitting apparatus 20 and a receiving apparatus 30.

The transmitting apparatus 20 comprises a coding and serial to parallel conversion circuit 21 and an LED (light emitting diode) array 22.

The coding and serial to parallel conversion circuit (hereinafter, simply referred to as a conversion circuit) 21 performs predetermined coding on the input electric signal, that is, the serial data, to convert it for example to a 16-bit parallel signal, outputs this to the LED array 22, and generates a signal S21 for driving the later explained LED units of the correspondingly provided LED array 22 based on the bit information.

The conversion circuit 21 adds information, for example, corresponding to the logic "1" and "0", at the time of coding.

The LED array 22 is configured, for example, by LED units (group) 22-1 to 22-16 for emitting visible rays (wavelength range of about 380 nm to 780 nm) arranged in a 44 matrix.

The number 16 of the LED units 22-1 to 22-16 corresponds to the number of bits of the converted parallel data of the conversion circuit 21. The LED units 22-1 to 22-16 are provided corresponding to the bits of the parallel data.

The LED units 22-1 to 22-16 are controlled in light emission in accordance with a drive signal S21 from the conversion circuit 21, that is, the bit information of the parallel data. The LED array 22 as a whole emits information light SOL dispersed within a spatially predetermined range.

Each of the LED units 22-1 to 22-16 is configured, for example, of a group of light emitting portion of 100 LEDs. Therefore, in the present embodiment, the LED array 22 is comprised using 1600 LEDs.

As the LEDs, for example, white LEDs used for illumination may be applied.

In this case, the LED array 22 can be used as lighting equipment in the office or home and is for example placed on the ceiling of a room.

Accordingly, the transmitting apparatus 20 according to the present embodiment is effective in a system for receiving information transmitted by using an optical communication technique and optical fibers as a transfer medium at the office or the home. In this case, the data input to the conversion circuit 21 of the transmitting apparatus is an electric signal converted from an optical signal in a not shown optical repeater.

If it is possible to transmit information at the rate of 25 Mbps from one LED unit in the LED array 22 of the present embodiment, this is equivalent to being able to transmit information light SOL corresponding to 400 Mbps from the entire 16 LED units.

Therefore, the transmitting apparatus 20 according to the present embodiment can be sufficiently used for the recent high speed optical communication of more than 100 Mbps, that is 200 Mbps and furthermore 400 Mbps.

The receiving apparatus 30 comprises a photo-diode array 31 as a light receiving element array, a condenser lens 32 as an optical system, 256 amplifiers $33n$ (n=integer from 1 to 256), 256 binarizing circuits $34n$, a data selection circuit 35, and a parallel to serial conversion and decoding circuit (hereinafter referred to as a conversion circuit) 36.

An information extraction circuit according to the present invention is configured by the amplifiers $33n$, binarizing circuits $34n$, data selection circuit 35, and conversion circuit 36.

The photo-diode array 31 is comprised, for example, of 256 photo-diodes arranged in a 16×16 matrix and outputs 256 electric signals of levels in accordance with amounts of light received from the photo-diodes at a high speed to the amplifiers $33n$ provided correspondingly in parallel.

The condenser lens 32 condenses the information light SOL transmitted form the LED array 22 of the transmitting apparatus 20 to a predetermined region of the photo-diode array 31.

Figure 2:
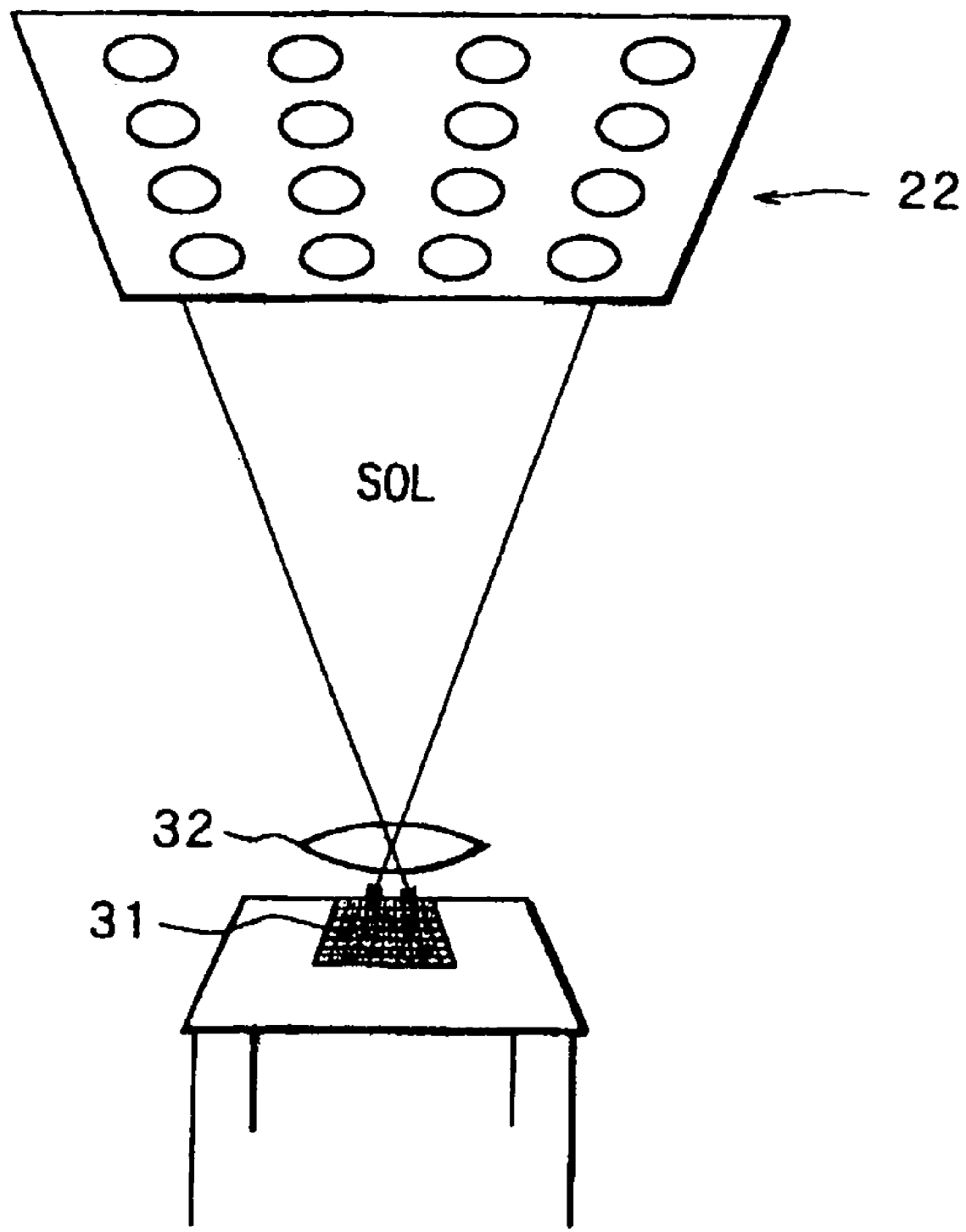
FIG. 2 is a view for explaining a state of receiving information light in the case of arranging a photo-diode array substantially right below an LED array according to the present invention.
Figure 3:
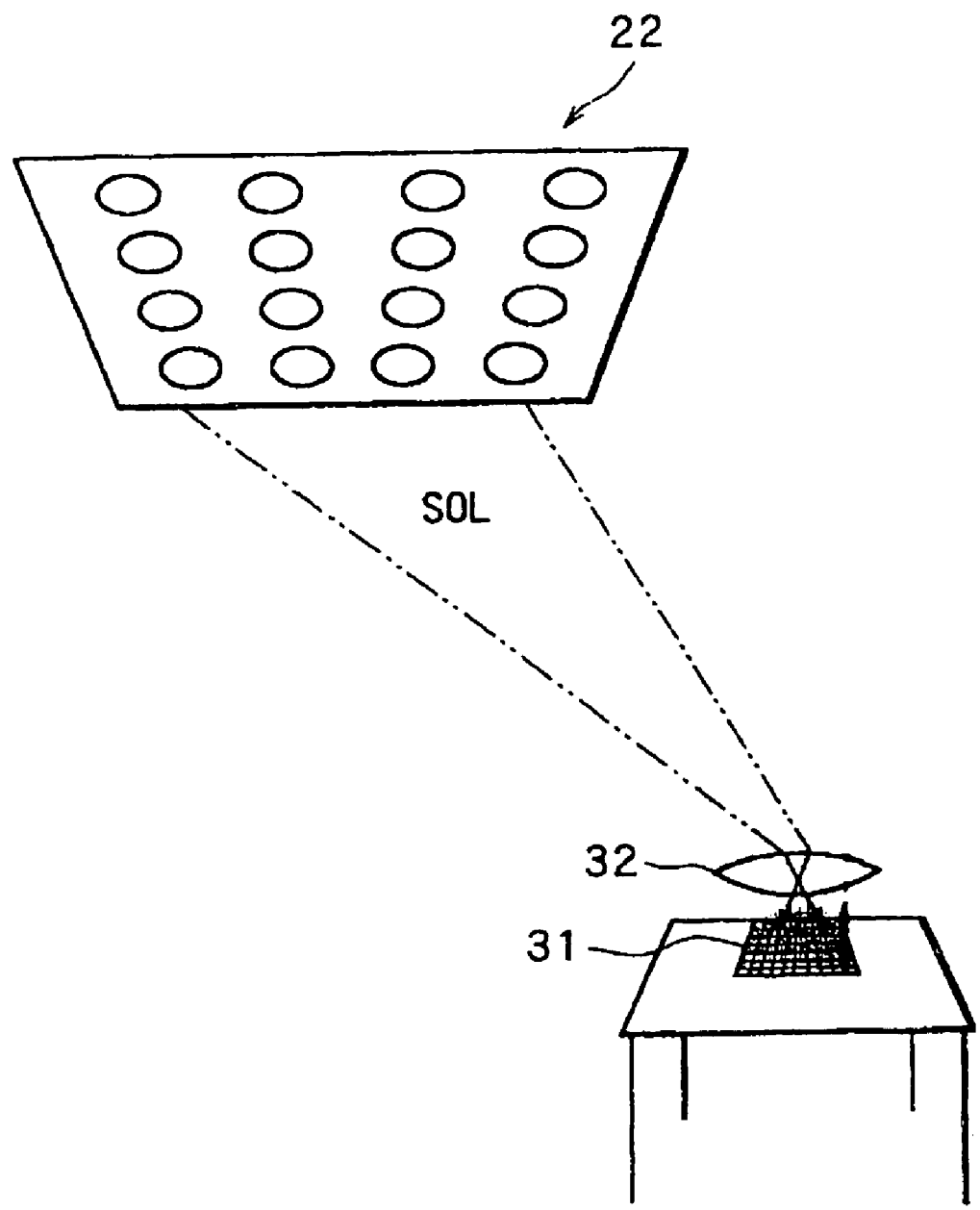
FIG. 3 is a view for explaining a state of receiving information light in the case of arranging a photo-diode array obliquely below an LED array according to the present invention.

Due to the condenser lens 32, it is possible to reliably guide the information light SOL to a predetermined region of the light receiving portion of the photo-diode array 31 when of course the receiving apparatus 30 is placed immediately below the LED array 22 provided on the ceiling, for example, as shown in FIG. 2, and even when the information light SOL is incident at an angle, for example, as shown in FIG. 3.

The amplifiers $33n$ amplify in parallel corresponding electric signals obtained by the photo-diodes of the photo-diode array 31 and output them to the correspondingly arranged binarizing circuits $34n$.

The binarizing circuits $34n$ compare the electric signals from the corresponding amplifiers $33n$ with a predetermined threshold value to binarizes them to "0" and "1" and outputs them to the data selection circuit 35.

The data selection circuit 35 receives the 256 bits of binarized data from the binarizing circuits $34n$, selects as parallel data 16 bits of data in accordance with the information light SOL corresponding to 16 bits transmitted from the transmitting apparatus 20, and outputs them to the conversion circuit 36.

The conversion circuit 36 decodes the 16 of bits data corresponding to the information light SOL selected by the data selection circuit 35, converts them from parallel data to serial data, and outputs them.

Next, the operation of a communication system having the above configuration will be explained.

For example, an electric signal, that is, serial data, is supplied to the conversion circuit 21 of the transmitting apparatus 20. In the conversion circuit 21, the input serial data are given predetermined information, converted to 16-bit parallel data, and supplied to the LED array 22.

In the LED array 22, the LED units 22-1 to 22-16 of the number corresponding to the number of bits of the parallel data from the conversion circuit 21 are controlled in light emission in parallel based on the bit information of the corresponding parallel data.

As a result, information light SOL dispersed in a spatially predetermined range is emitted from the LED array 22, for example, provided on the ceiling.

The information light SOL dispersed in a spatially predetermined range transmitted from the transmitting apparatus 30 is irradiated on a predetermined region of the photo-diode array of the receiving apparatus 30 via the condenser lens 32.

In the photo-diode array 31, a plurality of electric signals (256 in the present embodiment) of levels in accordance with amounts of light received are generated by all of the photo-diodes including the light receiving elements in the region receiving the information light SOL.

The 256 electric signals are generated in parallel, amplified by a predetermined gain by the corresponding amplifiers $33n$, and supplied to the corresponding binarizing circuits $34n$.

In the binarizing circuits $34n$, the electric signals from the corresponding amplifiers $33n$ are compared with a predetermined threshold values, binarized to "0" and "1", and they are output to the data selection circuit 35.

In the data selection circuit 35, the 256 bits of binarized data from the binarizing circuits $34n$ are received, 16 bits of data in accordance with the information light SOL corresponding to 16 bits transmitted from the transmitting apparatus 20 are selected as parallel data, and they are output to the conversion circuit 36.

Then, in the conversion circuit 36, the 16 bits of data corresponding to the information light SOL selected by the data selection circuit 35 are decoded, they are converted from parallel data to serial data, and are output.

As explained above, according to the present embodiment, since provision is made of a transmitting apparatus 20 comprising a conversion circuit 21 for converting serially input data to a plurality of bits of parallel data given predetermined information and an LED array 22 comprised of LED units of at least a number corresponding to the number of bits of the parallel data from the conversion circuit 21 arranged in an array, wherein the LED units are controlled in light emission in parallel based on bit information of corresponding parallel data to emit information light SOL dispersed in a spatially predetermined range, and of a receiving apparatus 30 having a photo-diode array 31 comprised of a plurality of photo-diodes for emitting electric signals of levels in accordance with amounts of light received arranged in an array, wherein the photo-diodes output electric signals in parallel, for selecting information in accordance with the information light SOL based on the plurality of electric signals output in parallel from the photo-diode array 31, converting the selected parallel data to serial data, and outputting the same, it is possible to sufficiently use the invention for high speed optical communication of more than 100 Mbps, for example 200 Mbps and furthermore 400 Mbps, and to reliably transmit and receive a high speed optical signal.

Note that needless to say the number of LED units of the LED array 22 and the number of photo-diodes of the photo-diode array 31 are not limited to those of the present embodiment.

Also, in a communication system, when assuming a downlink and uplink, the communication system of FIG. 1 corresponds to a downlink.

Figure 4:
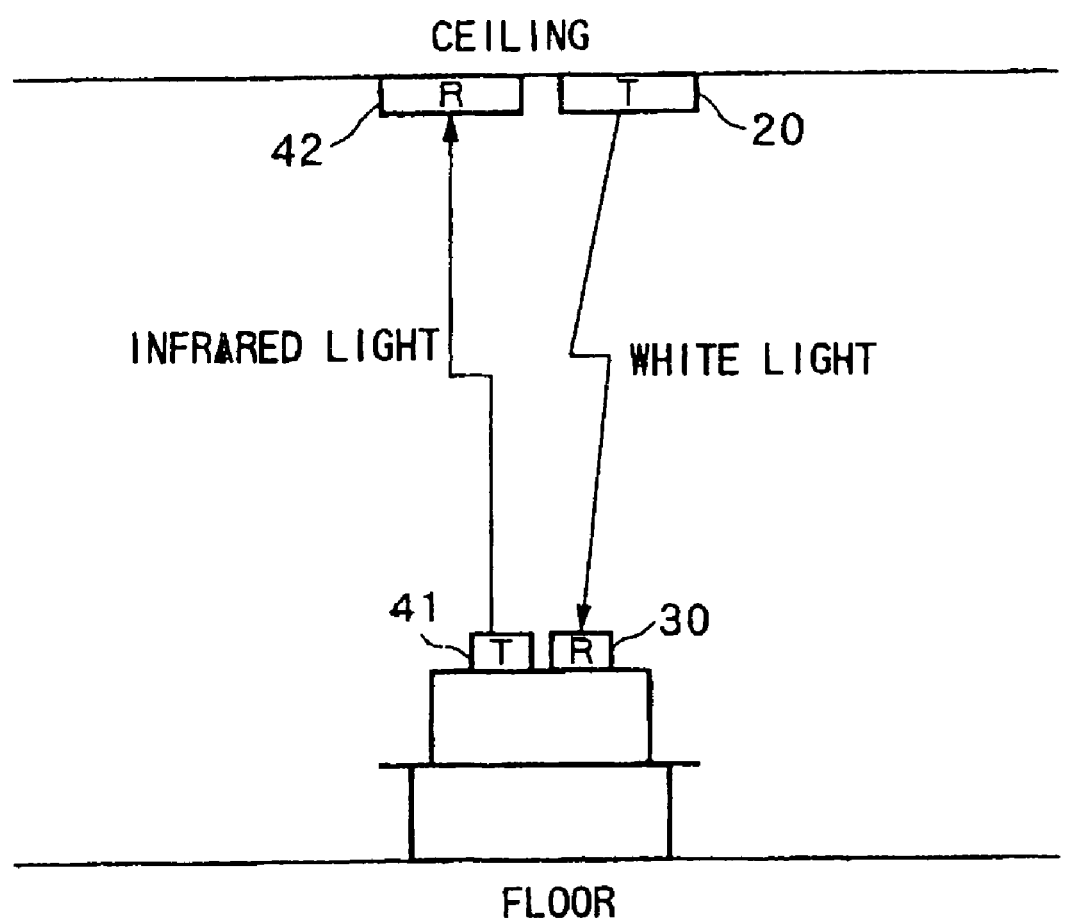
FIG. 4 is a view for explaining a transmission/receiving apparatus on an upside when constructing a communication system assuming a downlink and uplink.

To construct a system including an uplink, for example, as shown in FIG. 4, it is possible to transmit data to a receiving apparatus 42 provided on the ceiling etc. by using a transmitting apparatus using an infrared ray.

Second Embodiment

Figure 5:
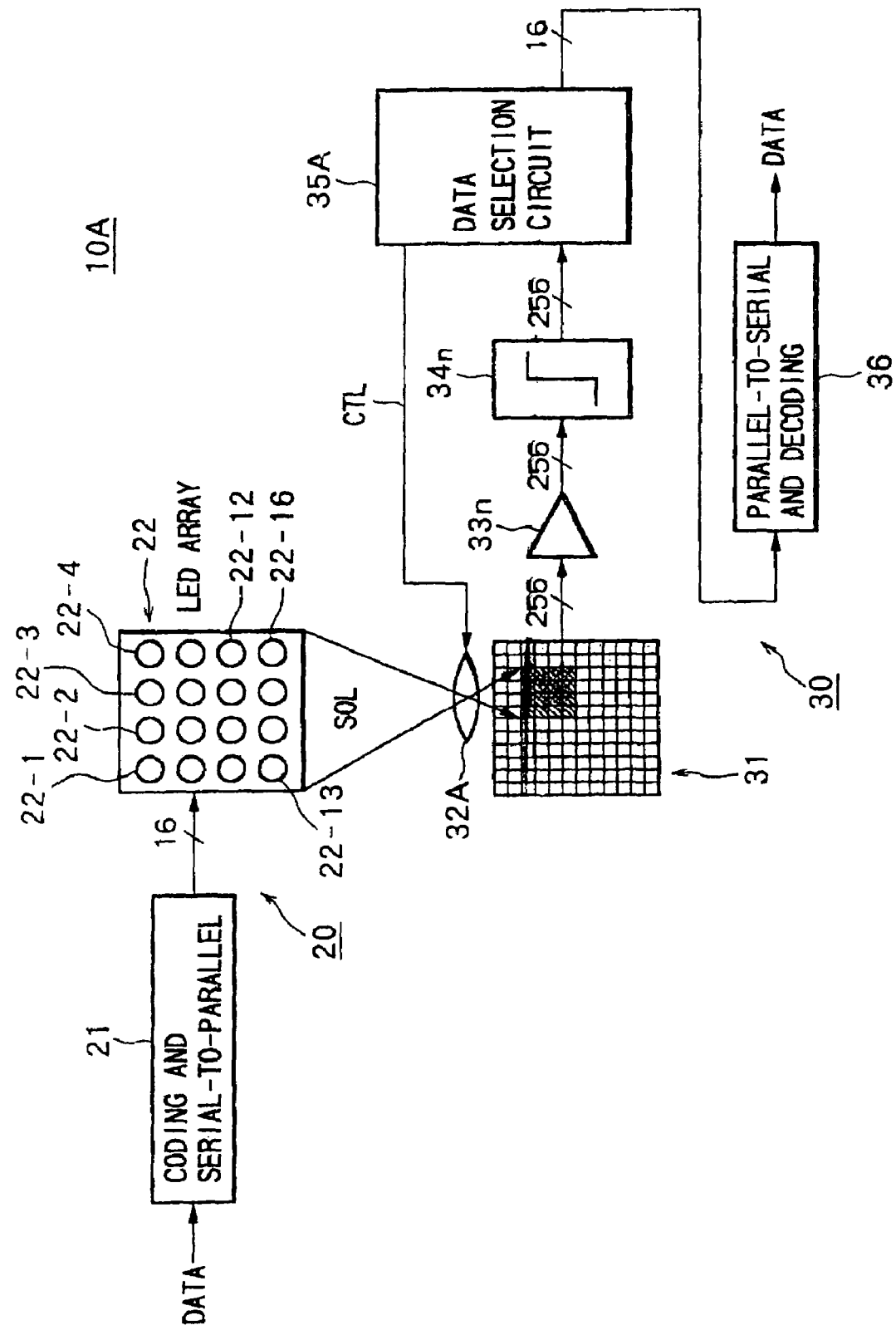
FIG. 5 is a view of the system configuration of a second embodiment of a communication system using a receiving apparatus and a transmitting apparatus according to the present invention.

FIG. 5 is a view of the system configuration of a second embodiment of a communication system using a receiving apparatus and a transmitting apparatus according to the present invention.

The point of difference of the second embodiment from the first embodiment is that a zoom lens 32A is used as an optical system and that when data in accordance with information light cannot be selected in a data selection circuit 35A, it is judged that the information light is not being condensed on the photo-diode array 31 as desired (for example, the focus is off) and a control signal CTL is output to the zoom lens 32A to adjust the focus.

According to the second embodiment, in addition to the effects of the first embodiment, there is an advantage that a further reliable receiving operation can be realized.

Note that in the above first and second embodiments, a binarizing circuit 34 was used, but of course this may also be a circuit for converting to a multilevel signal. Also, it is possible to use the analog value as it is.

Summarizing the effects of the invention, as explained above, according to the present invention, there is the advantage that a high speed optical signal can be reliably transmitted and received.

While the invention has been described with reference to specific embodiment chosen for purpose of illustration, it should be apparent that numerous modifications could be made thereto by those skilled in the art without departing from the basic concept and scope of the invention.

What is claimed is:

1. A communication system, comprising:
a transmitting apparatus for transmitting optical information in the form of a light beam dispersed in a spatially predetermined range formed by an array of a plurality of light emitting diodes corresponding to a number of bits of parallel input data, wherein a level of light emission from the plurality of light emitting diodes is in accordance with bit information of the parallel input data;

a receiving apparatus including a light receiving element array having a plurality of light receiving elements arranged in an array for receiving the light beam and outputting a plurality of electric signals at levels corresponding to amounts of light received, wherein the light receiving elements output electric signals in parallel, and an information extraction circuit for receiving a plurality of electric signals output in parallel from the light receiving element array and extracting information in accordance with the optical information signal based on the plurality of electric signals, wherein the receiving apparatus comprises an optical system for condensing the light beam to a predetermined region of a light receiving region of the light receiving element array, and wherein the optical system is capable of adjusting a position of a light axis direction based on a control signal; and the information extraction circuit outputs the control signal for adjusting the position of the light axis direction to the optical system when information in accordance with the optical information cannot be extracted based on the plurality of electric signals, wherein said transmitting apparatus comprises lighting equipment placed on a ceiling of a room.

2. The communication system as set forth in claim 1, wherein a wavelength of the optical information transmitted by said transmitting apparatus is within a visible wavelength range.

3. The communication system as set forth in claim 1, wherein the information extraction circuit of the receiving apparatus comprises:
a binarizing circuit for binarizing the plurality of electric signals from the light receiving element array;
a data selection circuit for selecting data corresponding to the optical information from the plurality of binarized electric signals from the binarizing circuit; and
a conversion circuit for decoding data corresponding to the optical information selected by said data selection circuit and converting it from parallel data to serial data.

4. The communication system as set forth in claim 1, wherein the information extraction circuit of the receiving apparatus comprises:
a binarizing circuit for binarizing the plurality of electric signals from the light receiving element array;
a data selection circuit for selecting data corresponding to the optical information from the plurality of binarized electric signals from the binarizing circuit; and
a conversion circuit for decoding data corresponding to the optical information selected by the data selection circuit and converting it from parallel data to serial data.

* * * * *